US012129166B2

(12) United States Patent
Bauck et al.

(10) Patent No.: US 12,129,166 B2
(45) Date of Patent: Oct. 29, 2024

(54) FLUID DISPENSER SYSTEM

(71) Applicant: Graco Minnesota Inc., Minneapolis, MN (US)

(72) Inventors: Mark L. Bauck, Coon Rapids, MN (US); Michael E. Bloom, Anoka, MN (US); Bradley G. Kahler, Otsego, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 0 days.

(21) Appl. No.: 17/742,888

(22) Filed: May 12, 2022

(65) Prior Publication Data

US 2022/0396466 A1 Dec. 15, 2022

Related U.S. Application Data

(60) Provisional application No. 63/210,257, filed on Jun. 14, 2021.

(51) Int. Cl.
*B67D 7/42* (2010.01)
*B67D 7/30* (2010.01)

(52) U.S. Cl.
CPC ............. *B67D 7/303* (2013.01); *B67D 7/425* (2013.01); *B67D 7/426* (2013.01)

(58) Field of Classification Search
CPC ................................ B67D 7/425; B67D 7/426
See application file for complete search history.

(56) References Cited

U.S. PATENT DOCUMENTS 3,383,044 A 5/1968 Norstrud et al.
3,638,689 A 2/1972 Eklund
(Continued)

FOREIGN PATENT DOCUMENTS

CN 101979699 A 2/2011
CN 102123939 A 7/2011
CN 105377447 A 3/2016
CN 106988197 A 7/2017
(Continued)

OTHER PUBLICATIONS

Extended European Search Report for EP Application No. 22176324.6, dated Nov. 7, 2022, 9 pages.
Chinese Office Action from Chinese Application No. 2022106656502, dated May 31, 2023, 13 pages.

*Primary Examiner* — Paul J Gray
(74) *Attorney, Agent, or Firm* — Kinney & Lange, P.A.

(57) ABSTRACT

A fluid dispenser system is disclosed herein that is configured to switch between an open position in which fluid flows through a fluid channel and a closed position in which fluid is prevented from flowing through the fluid channel. The fluid dispenser system includes a valve disposed along the fluid channel and configured to move between the open valve position and the closed valve position, a trigger actuatable between an open trigger position and a closed trigger position which move the valve between the open valve position and the closed valve position, a trigger latch configured to move between a latched position in which the trigger latch fixes the trigger in the open trigger position and an unlatched position in which the trigger latch does not constrain movement of the trigger, and a solenoid with a solenoid pin. The solenoid is configured to translate the solenoid pin between an extended position capable of retaining the trigger latch in the latched position and a retracted position that allows the trigger latch to move into the unlatched position.

20 Claims, 5 Drawing Sheets

(56) References Cited

U.S. PATENT DOCUMENTS

| | | | |
|---|---|---|---|
| 4,162,042 A | 7/1979 | Hemming et al. | |
| 4,883,199 A | 11/1989 | Ouarve et al. | |
| 5,881,955 A | 3/1999 | Styne | |
| 6,032,922 A | 3/2000 | Shew | |
| 6,357,300 B1 | 3/2002 | Johnson et al. | |
| 6,443,328 B1 | 9/2002 | Fehl et al. | |
| 6,659,306 B2 | 12/2003 | Boyle et al. | |
| 8,215,522 B2 | 7/2012 | Breeser et al. | |
| 2009/0314980 A1 | 12/2009 | Breeser | |
| 2019/0105676 A1 | 4/2019 | Kahler et al. | |
| 2019/0285192 A1* | 9/2019 | Numazaki | H01F 7/06 |
| 2020/0048068 A1 | 2/2020 | Bloom et al. | |

FOREIGN PATENT DOCUMENTS

| | | |
|---|---|---|
| CN | 107787252 A | 3/2018 |
| CN | 111201196 A | 5/2020 |
| EP | 3199243 B1 | 5/2021 |

* cited by examiner

FLUID DISPENSER SYSTEM

CROSS-REFERENCE TO RELATED APPLICATION(S)

This application claims the benefit of U.S. Provisional Application No. 63210257 filed Jun. 14, 2021 for "Fluid Dispenser System" by M. Bauck, M. Bloom, and B. Kahler.

FIELD OF THE INVENTION

The present disclosure relates to a fluid dispenser system and, more particularly, to a system for dispensing a specific, preset amount of fluid through the control of a solenoid latching mechanism.

BACKGROUND

The volume (or weight) of fluid dispensed by a hand-held meter valve can be difficult to determine. Generally, an operator can manually pull and release a trigger to dispense and halt the flow of fluid. This configuration requires the operator to remain near the hand-held meter valve, which can be burdensome and time consuming. With this configuration, it is often difficult to dispense an exact volume/amount because of the reaction time of the operator.

SUMMARY

In one embodiment, a fluid dispenser system is disclosed herein that is configured to switch between an open position in which fluid flows through a fluid channel and a closed position in which fluid is prevented from flowing through the fluid channel. The fluid dispenser system includes a valve along the fluid channel configured to move between the open valve position and the closed valve position, a trigger actuatable between an open trigger position and a closed trigger position which move the valve between the open valve position and the closed valve position, a trigger latch configured to move between a latched position in which the trigger latch holds the trigger in the open trigger position and an unlatched position in which the trigger latch does not interfere with the trigger, and a solenoid having a solenoid pin. The solenoid is configured to translate the solenoid pin between an extended position capable of retaining the trigger latch in the latched position and a retracted position that allows the trigger latch to move into the unlatched position.

In another embodiment, a mechanism is disclosed herein that is configured to hold a valve in an open valve position for a preset duration to allow a specific volume of fluid to flow through the valve. The mechanism includes a trigger configured to move the valve into the open valve position, a trigger latch adjacent the trigger and configured to hold the trigger in an open trigger position which corresponds to the open valve position, a solenoid with a solenoid pin configured to extend to hold the trigger latch in a latched position which in turn holds the trigger in the open trigger position, and a meter having at least one computer processor and configured to instruct the solenoid to retract the solenoid pin to allow the trigger latch to move into an unlatched position which does not hold the trigger in the open trigger position.

DETAILED DESCRIPTION

Figure 1:
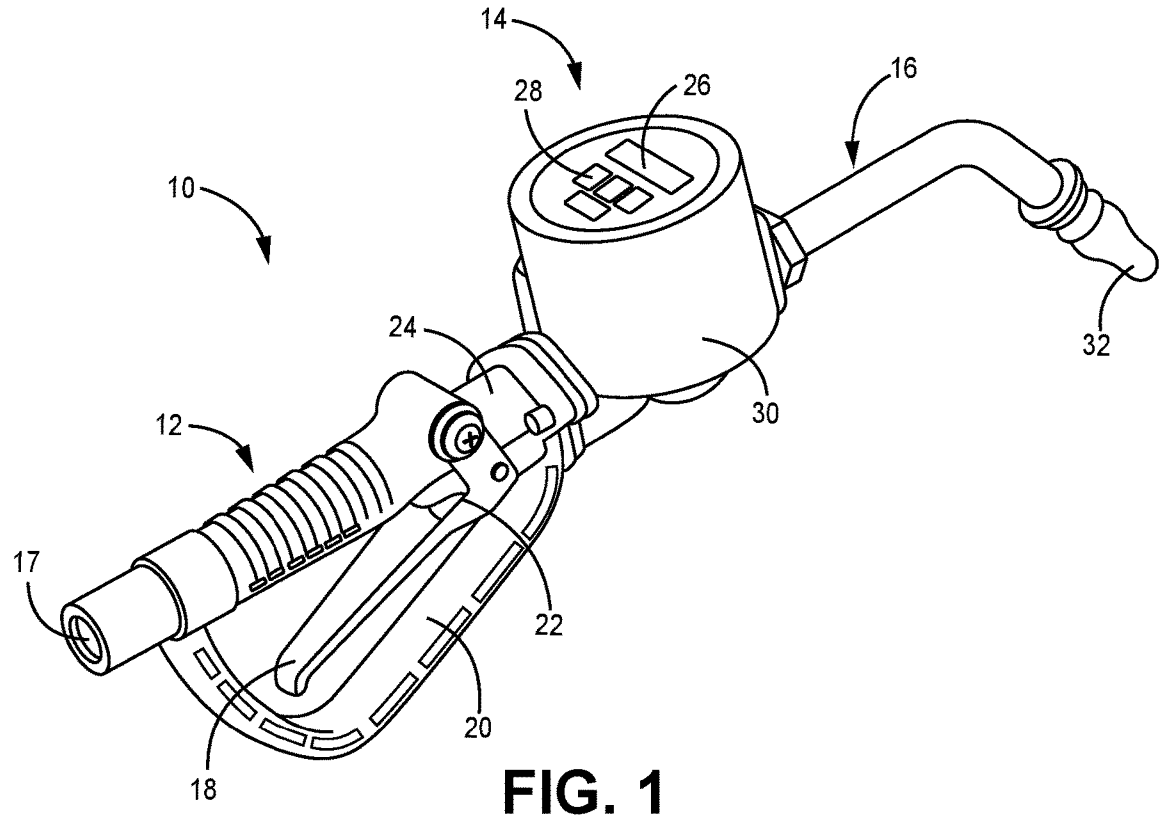
FIG. 1 is a perspective view of a fluid dispenser system.

A fluid dispenser is disclosed that includes a valve situated along a fluid channel (in a housing) that opens and closes to allow a fluid, such as a lubricant, to flow therethrough. The valve is controlled by a trigger, which pivots to move the valve between the open valve position and the closed valve position. The trigger can be actuated (to move the valve into the open valve position) by an operator that squeezes/pulls the trigger towards the housing and allows the valve to close by releasing the trigger, allowing the trigger to pivot back into the closed valve position. A trigger latch is adjacent the trigger and can pivot between a latched position in which the trigger latch holds the trigger in the open trigger position (which corresponds to the open valve position) and an unlatched position in which the trigger latch does not interfere with the pivoting motion of the trigger. The trigger latch can be moved into the latched position manually by the operator. Once in the latched position, a solenoid with an extendable/retractable solenoid pin holds the trigger latch in place in the latched position, which in turn holds the trigger in the open trigger position. The extension/retraction of the solenoid pin by the solenoid can be controlled by a meter (which may include at least one computer processor). The meter can accept input from the operator, such as an amount of fluid the fluid dispenser should convey through the valve.

For example, the operator can input into the meter through a visual display and at least one key that the fluid dispenser is to dispense five gallons of fluid. The operator then pivots/pulls the trigger into the open trigger position to push the valve into the open valve position and uses the trigger latch to hold the trigger in the open trigger position. The solenoid pin is in an extended position to hold the trigger latch in the latched position. Once the preset amount of fluid (e.g., five gallons) has flowed through/passed the valve/fluid channel and out of the fluid dispenser, the meter can instruct the solenoid to retract the solenoid pin. Without the solenoid pin extended to hold the trigger latch in the latched position, the trigger latch pivots into the unlatched position, which does not interfere with the trigger. Thus, the trigger is allowed to pivot into the closed trigger position which in turn allows the valve to move into the close valve position to plug the fluid channel.

The meter can be in communication with a fluid measurement device and/or other sensors to measure the amount/volume of fluid flowing through the valve/fluid channel and communicate that measurement to the meter. The meter can use this information to determine at what time to instruct the solenoid to retract the solenoid pin which in turn results in the closing of the valve. The measurement device/sensor can be any type or configuration of sensor to allow for the determination of volume and/or weight of fluid flowing through the valve.

The trigger latch can include one or a set of rollers that interact with the solenoid pin and an outer side of a valve housing to hold the trigger latch in the latched position when the solenoid pin is extended. The rollers can be sized and shaped to limit the amount of force on the solenoid pin that holds the trigger latch in the latched position. For example, the set of rollers can include three rollers that are all colinear along a line/axis/bar that extends perpendicular to the solenoid pin. The three rollers include two end rollers that have a greater diameter than a middle roller. The middle roller is in contact with the solenoid pin and rotates when the solenoid pin retracts to reduce the force needed to retract the solenoid pin. The end rollers do not contact the solenoid pin but rather can contact an angled portion, called the ramp, on the outer side of the valve housing. The angle of the ramp is configured to provide additional reduction in the force needed by the solenoid pin to hold the rollers, and thus the trigger latch, in place in the latched position. In one example, the angle of the ramp is between seventy and ninety degrees as measured from a line parallel to the solenoid pin. The ramp also reduces the amount of force needed by the solenoid to retract the solenoid pin.

This reduction in force on the solenoid pin is advantageous because it reduces the energy needed to extend and retract the solenoid pin, which in turn increases the lifespan of the solenoid and solenoid pin, which can operate on battery power. The reduction in force also minimizes the battery power required for each retraction of the solenoid pin, which in turn increases overall battery life. Additionally, the decreased forces on the solenoid and solenoid pin means decreased stresses on the solenoid and solenoid pin, which results in less likelihood that the solenoid pin will bend and be rendered inoperable.

Another advantage of the disclosed fluid dispenser system is that the solenoid is fluidically/environmentally sealed within the valve housing and/or a meter housing by one or multiple seals, such as a bellows seal that seals the interface between the solenoid and the solenoid pin and/or a solenoid seal that seals the interface between the solenoid and the housing(s). The solenoid being fluidically/environmentally sealed prevents fluid and other contaminants from infiltrating the solenoid and damaging the internal components of the solenoid, which may be sensitive to environmental conditions. These and other advantages will be realized in the description with regards to FIGS. 1-3 below.

FIG. 1 is a perspective view of fluid dispenser system 10. Fluid dispenser system 10 includes handle 12, meter 14, extension 16, and fluid channel 17 extending through fluid dispenser system 10. Handle 12 includes trigger 18, trigger guard 20, trigger latch 22, and valve housing 24 (with a valve shown in FIGS. 2A-2F contained within valve housing 24). Meter 14 includes display 26, keys 28, and meter housing 30. Extension 16 includes nozzle 32 which as at a downstream end of fluid channel 17 and through which fluid flows out of fluid dispenser system 10.

Fluid dispenser system 10 controls the volume/amount of fluid dispensed from a tank or other reservoir upstream of fluid channel 17 out nozzle 32 of extension 16. Fluid dispenser system 10 can be fluidically connected to the reservoir by a hose/tube that extends from the reservoir to an upstream portion of fluid channel 17 in handle 12. The fluid conveyed by fluid dispenser system 10 can be any liquid, including petroleum, gasoline, kerosene, diesel, oil or another lubricant, water, or any other type of liquid in which a preset specific volume/amount dispensed is desired. Fluid dispenser system 10 can include one or multiple fluid measurement devices (e.g., sensors) that measure the volume of the fluid flowing through fluid channel 17 and conveys that measurement to meter 14. Additionally or alternatively, fluid dispenser system 10 can determine the weight of fluid flowing through fluid channel 17 through the use of fluid measurement devices that directly measure the weight of the fluid and/or by performing calculations using the volume and specific weight of the fluid. Thus, when this disclosure uses the term “amount” with regards to the fluid, it is intended to represent volume, weight, or both. This disclosure may use the directions “right” and “left” with regards to FIGS. 1-3. However, these directions are only relative to the depiction of fluid dispenser system 10 in FIGS. 1-3 and may change if the orientation of fluid dispenser system 10 is different than that set out in FIGS. 1-3.

As described below, fluid dispenser system 10 is used by an operator to dispense a specific, preset amount of fluid through fluid channel 17 and out of nozzle 32 of extension 16. The operator holds fluid dispenser system 10 by handle 12. To open fluid dispenser system 10 to allow fluid to dispense from nozzle 32, the operator pulls trigger 18 towards valve housing 24. The rotation of trigger 18 moves a valve, which is in fluid channel 17 within valve housing 24, into an open valve position to allow fluid to flow passed the valve and through fluid channel 17. Once in the open valve position (with trigger 18 pulled into the open trigger position such that trigger 18 extends along and is adjacent valve housing 24), trigger latch 22 is rotated into a latched position in which trigger latch 22 holds trigger 18 in place adjacent valve housing 24. After a specific, preset amount of fluid has flowed through fluid channel 17, meter 14 or another component that can include one or multiple computer processors instructs fluid dispenser system 10 to unlatch trigger latch 22 to rotate out of the latched position which in turn allows trigger 18 to rotate out of the open trigger position adjacent valve housing 24 and into the closed trigger position, which is shown in FIG. 1. In the closed trigger position (which corresponds to the closed valve position), the valve plugs fluid channel 17, preventing fluid from flowing through fluid dispenser system 10.

The specific, preset amount of fluid is set by the operator interacting with meter 14, or the preset amount is a default amount that was set by fluid dispenser system 10 before the operator interacts with fluid dispenser system 10. The operator can use meter 14, which is mounted on meter housing 30, to set the preset amount. Using keys 28 and display 26 on meter 14, the operator can input an amount of fluid that fluid dispenser system 10 is to dispense out of nozzle 32. Keys 28 can include a variety of capabilities, including up and down arrows, a keypad with numbers zero through nine, delete and enter keys, and/or other buttons. The inputs can be shown on display 26, which can show a number that represents the specific, preset amount of fluid that fluid dispenser system 10 is to dispense. Additionally, display 26 can show other information, such as whether the preset amount is a volume, weight, or other measurement and/or what measurement units the preset amount is measured in (e.g., liters, quarts, gallons, pounds, or kilograms). Meter 14 can include other components, such as fluid measurement devices, batteries, and wireless communication capabilities, not explicitly shown in FIG. 1 and/or described herein.

Extension 16 is connected to meter housing 30 and provides the downstream-most portion of fluid channel 17, which terminates at nozzle 32. Extension 16 can have any size, shape, or configuration to convey fluid from meter housing 30 and out of fluid dispenser system 10 through nozzle 32. As shown in FIG. 1, extension 16 has a slight bend near nozzle 32 to change the direction of the fluid flowing out of nozzle 32. Extension 16 can be one continuous and monolithic component with meter housing 30 or the two can be multiple pieces fastened together. As shown, extension 16 is connected to meter housing 30 using a threaded attachment in which an outer surface of extension 16 threads into an inner surface of a portion of meter housing 30. Extension 16 can include other components and features not explicitly shown in FIG. 1 and/or described herein, such as insulation on an outer surface and/or features that vary the cross-sectional area of fluid channel 17 extending through extension 16.

Valve housing 24 and meter housing 30 are structural components of fluid dispenser system 10 and contain and protect the internal component of fluid dispenser system 10. Valve housing 24 and meter housing 30 can be one continuous and monolithic component or can be multiple pieces connected to one another. In the present embodiment, valve housing 24 and meter housing 30 are two separate components connected and sealed to one another. Valve housing 24 and meter housing 30 can be constructed from any material suitable to protect the internal components of fluid dispenser system 10. Valve housing 24 can include trigger guard 20, which extends from valve housing 24 around trigger 18 to prevent the unintentional movement of trigger 18 into the open trigger position. Trigger guard 20 can be one continuous and monolithic component with valve housing 24 (e.g., molded or otherwise formed together during manufacturing) or can be a separate component attached to valve housing 24. Valve housing 24 and/or meter housing 30 can have other components and features not explicitly shown or described in this disclosure.

Figure 2A:
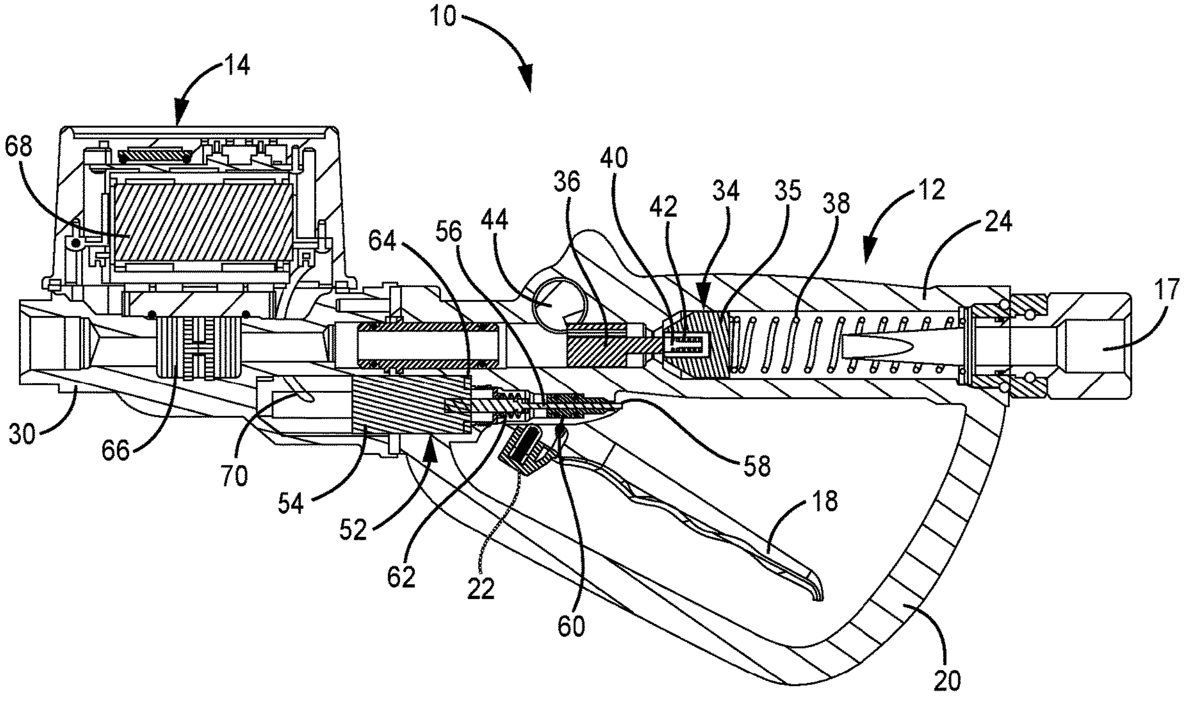
FIG. 2A is a cross-sectional view of the fluid dispenser system having a trigger in the closed trigger position and a valve in the closed valve position.
Figure 2B:
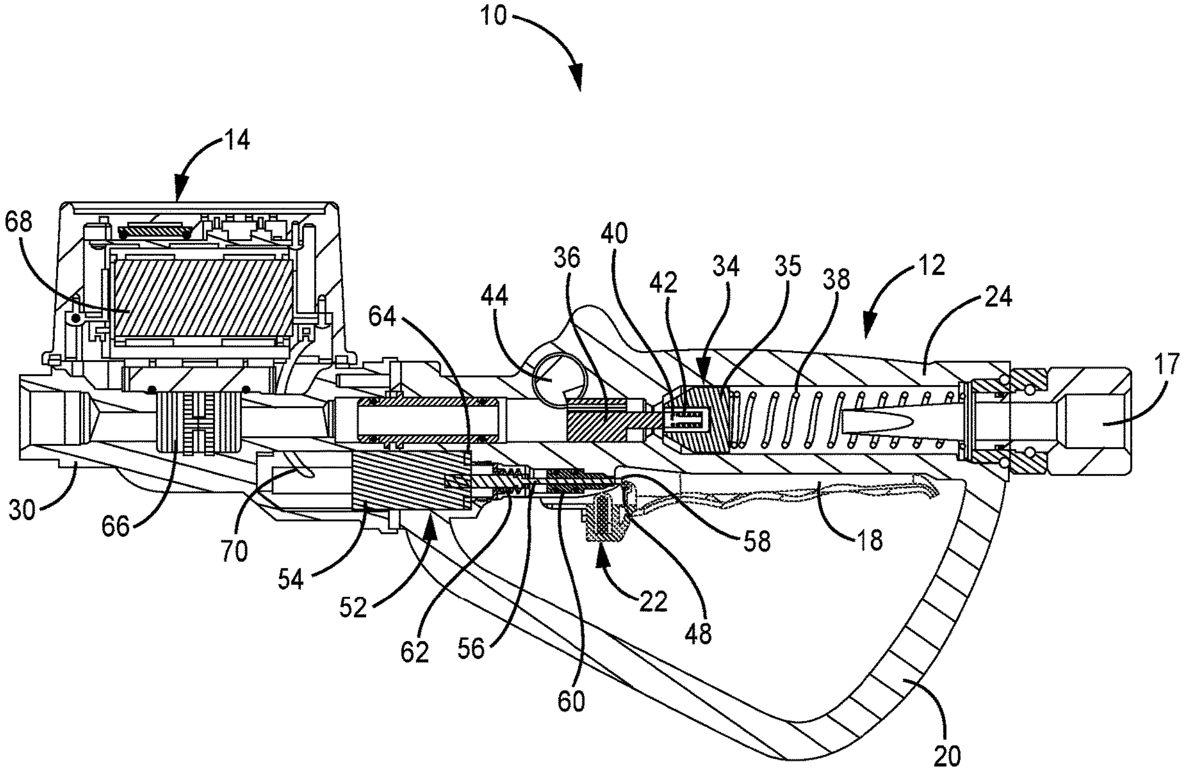
FIG. 2B is a cross-sectional view of the fluid dispenser system having the trigger in the open trigger position and a trigger latch in the unlatched position.
Figure 2C:
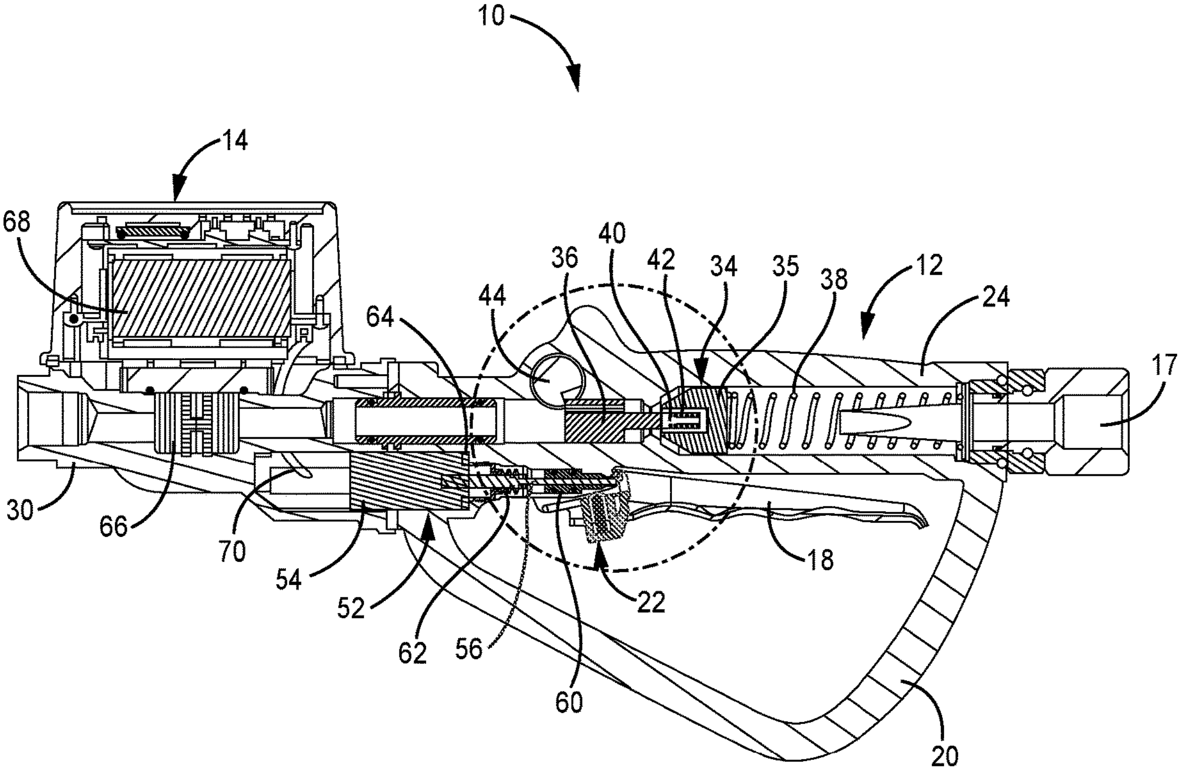
FIG. 2C is a cross-sectional view of the fluid dispenser system having the trigger in the open trigger position and the trigger latch in the latched position.
Figure 2D:
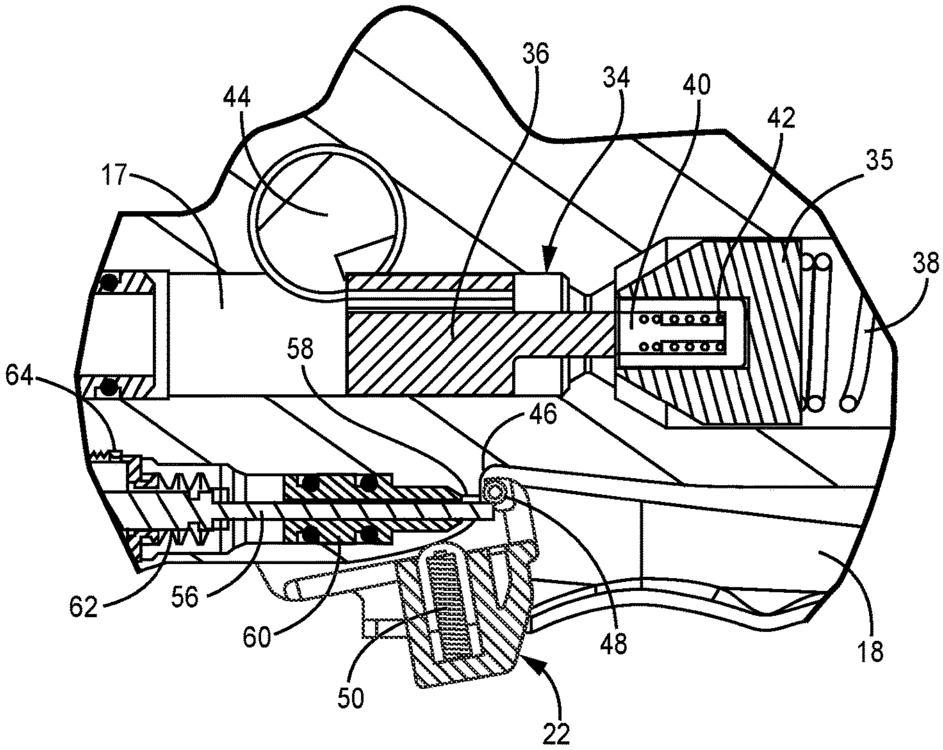
FIG. 2D is an enlarge cross-sectional view of the fluid dispenser system of FIG. 2C.
Figure 2E:
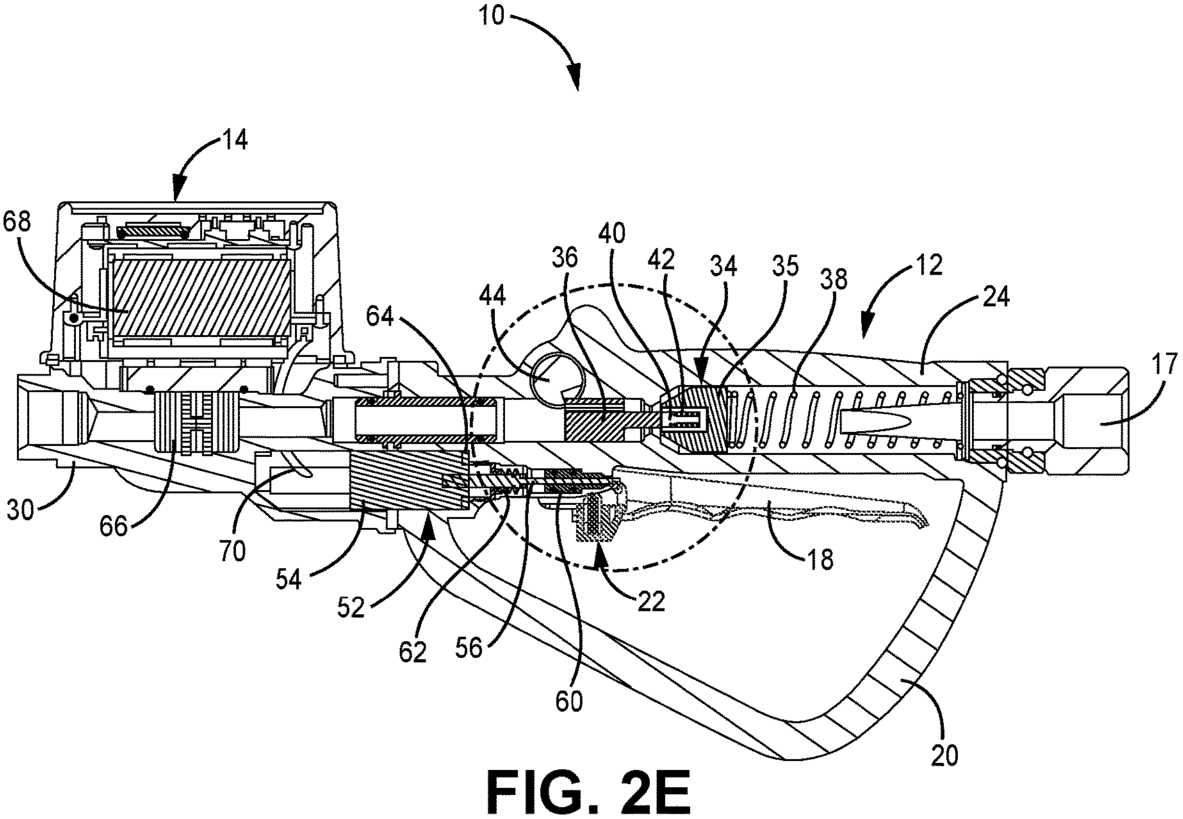
FIG. 2E is a cross-sectional view of the fluid dispenser system having the trigger in the open trigger position and the trigger latch in the unlatched position immediately after becoming unlatched.
Figure 2F:
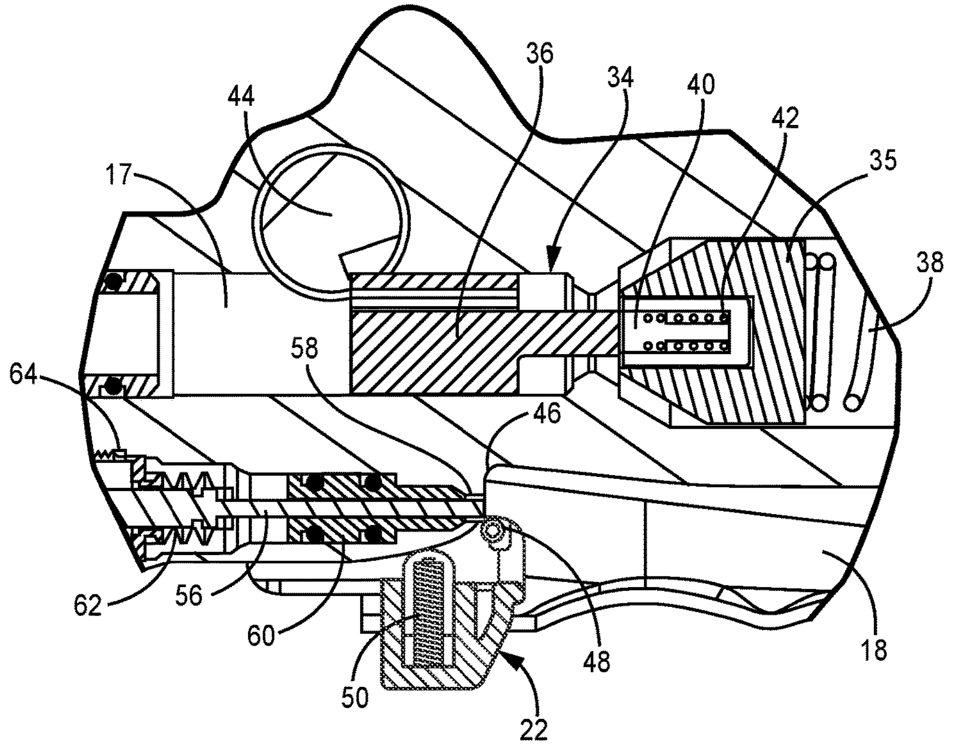
FIG. 2F is an enlarged cross-sectional view of fluid dispenser system of FIG. 2E.
Figure 3:
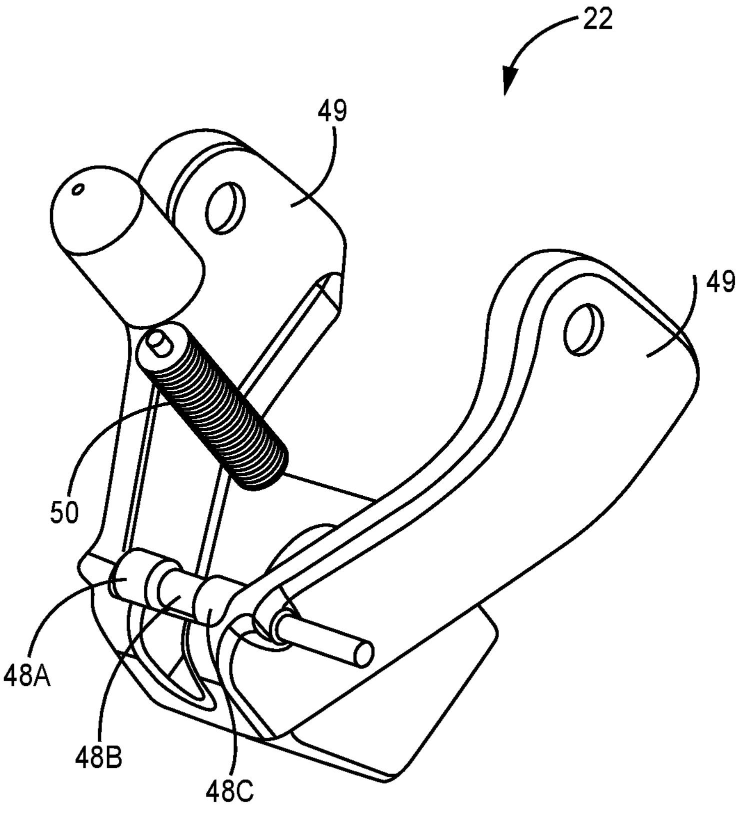
FIG. 3 is a perspective view of the trigger latch with rollers.

FIGS. 2A-3 are described together. FIG. 2A is a cross-sectional view of fluid dispenser system 10 having trigger 18 in the closed trigger position and a valve in the closed valve position. FIG. 2B is a cross-sectional view of fluid dispenser system 10 with trigger 18 in the open trigger position and trigger latch 22 in the unlatched position. FIG. 2C is a cross-sectional view of fluid dispenser system 10 having trigger 18 in the open trigger position and trigger latch 22 in the latched position, and FIG. 2D is an enlarge cross-sectional view of fluid dispenser system 10 of FIG. 2C. FIG. 2E is a cross-sectional view of fluid dispenser system 10 having trigger 18 in the open trigger position and trigger latch 22 in the unlatched position immediately after becoming unlatched, and FIG. 2F is an enlarged cross-sectional view fluid dispenser system 10 of FIG. 2E. FIG. 3 is a perspective view of the trigger latch with rollers.

Fluid dispenser system 10 includes handle 12, meter 14, extension 16 and fluid channel 17. Fluid dispenser system 10 further includes valve 34 (within valve housing 24) having valve head 35, primary plunger 36, main spring 38, secondary plunger 40, and secondary spring 42. Also within valve housing 24 is cam 44, while ramp 46 is located on an outer side of valve housing 24. Trigger latch 22 includes roller 48 and latch spring 50. Within one or both of valve housing 24 and meter housing 30 is solenoid system 52, which includes solenoid 54, solenoid pin 56 having pin tip 58, pin guide 60, bellows seal 62, and solenoid seal 64. Fluid dispenser system 10 can further include fluid measurement device 66, while meter 14 further includes processor 68 and communication line 70.

Fluid dispenser system 10 can include other features, components, configurations, and/or characteristics not explicitly shown in FIGS. 2A-2F and described in this disclosure. Additionally, extension 16 of fluid dispenser system 10 is not shown in FIGS. 2A-2F and, in some embodiments, extension 16 may not be included in fluid dispenser system 10 and instead fluid channel 17 terminates at meter housing 30 with fluid being dispensed out of meter housing 30.

Valve 34 is positioned along fluid channel 17 of fluid dispenser system 10. While shown as being contained within valve housing 24, valve 34 can be located anywhere along fluid channel 17. Valve 34 includes valve head 35, which is a plug that seals fluid channel 17 when in the closed position. Valve head 35 can have any size, shape, and/or configuration suitable to plug fluid channel 17 when in the closed valve position to prevent fluid from flowing through fluid channel 17 and allow fluid to flow through fluid channel 17 when in the open valve position. As shown in FIGS. 2A-2F, valve head 35 is configured to move parallel to fluid channel 17 between the open valve position (a location of valve head 35 that is to the right) and the closed valve position (a location of valve head 35 that is to the left).

Valve 34 includes primary plunger 36, which is in contact with and pushes valve head 35 into the open valve position. Primary plunger 36 can have a variety of configurations, such as having a hollow or filled cylindrical shape (or being made up of multiple cylindrical portions having differing diameters), a hollow or filled frustoconical shape, orifices and/or cutouts, and other configurations and/or features suitable for pushing valve head 35 into the open valve position without blocking fluid from flowing through fluid channel 17. Primary plunger 36 is configured to interact with cam 44 (discussed below) to be pushed by cam 44, which in turn pushes valve head 35 into the open valve position. Primary plunger 36 can be fixedly attached to valve head 35 or just in contact with valve head 35 continuously or only when primary plunger 36 is pushing valve head 35 into the open valve position. Main spring 38 is a resilient member configured to bias valve head 35 into the closed valve position when primary plunger 36 is not pushing valve head 35 into the open valve position. Main spring 38 can be on an opposite side of primary plunger 36 surrounding/within fluid channel 17, as shown in FIGS. 2A-2F, or main spring 38 can have another location suitable for biasing valve head 35 into the closed valve position. Main spring 38 can be a coil spring or another resilient component. The resiliency of main spring 38 should be designed to allow for valve head 35 to be pushed by primary plunger 36 without undue force, but should be sufficient to bias valve head 35 into the closed valve position when primary plunger 36 is not pushing on valve head 35. Thus, when primary plunger 36 is at rest and not pushing on valve head 35, valve head 35 is positioned to the left in FIGS. 2A-2F and held in contact with the outer side of fluid channel 17 to seal/plug fluid channel 17.

Valve 34 may also include secondary plunger 40 and secondary spring 42, which can be located within valve head 35. Secondary plunger 40 can be similar in configuration to primary plunger 36, while secondary spring 42 can be similar in configuration to main spring 38. Secondary plunger 40 can be configured to move a relatively small amount left and right with secondary plunger 40 being biased by secondary spring 42 to the left to contact and apply force on primary plunger 36. Secondary plunger 40 can be configured to be pushed to the right by primary plunger 36 (when primary plunger 36 is pushed into the open valve position by cam 44), which can overcome the resiliency force of secondary spring 42 to push secondary plunger 40 to contact and in turn push valve head 35 to the right into the open valve position.

Secondary plunger 40 and secondary spring 42 can work together to ensure that force is imparted on primary plunger 36 when primary plunger 36 is in the closed valve position (to the left). This force on primary plunger 36 in turn ensures primary plunger 36 rotates cam 44 entirely clockwise into the closed valve/trigger position, which in turn ensures that trigger 18, which rotates in unison with cam 44, rotates entirely back to the closed trigger position and does not have the ability to move towards or away from valve housing 24 a small amount without the application of force by the operator. Thus, secondary plunger 40 and secondary spring 42 work together to ensure that trigger 18, when in the closed trigger position, cannot rattle by applying a relatively small amount of force to hold trigger 18 stationary.

Cam 44 can be located within valve housing 24, is attached to or otherwise configured to rotate in unison with trigger 18, and is in contact with primary plunger 36 to push primary plunger 36 into the open valve position when rotated by the pulling of trigger 18. Cam 44 can have a substantially cylindrical shape that rotates about a centerline of the cylinder, or cam 44 can have another size, shape, or configuration suitable for pushing primary plunger 36. In FIGS. 2A-2F, cam 44 has a notch that provides a contact surface with primary plunger 36 to push primary plunger 36 when cam 44 rotates. As shown in FIG. 1 in combination with FIGS. 2A-2F, trigger 18 and cam 44 rotate in unison about a common axis with both trigger 18 and cam 44 being anchored to valve housing 24. When trigger 18 is pulled towards valve housing 24 by the operator, cam 44 rotates (clockwise in FIG. 1 and counterclockwise in FIGS. 2A-2F) to push primary plunger 36, which in turn pushes valve head 35 into the open valve position to allow fluid to flow through fluid channel 17. In other embodiments of fluid dispenser systems, cam 44 may not be present in fluid dispenser system 10 and instead trigger 18 can contact primary plunger 36 directly to push primary plunger 36.

Solenoid system 52 is shown as being contained/located within valve housing 24 and meter housing 30, but solenoid system 52 can be contained/located within either of valve housing 24, meter housing 30, or another component of fluid dispenser system 10. Housings 24 and 30 protect solenoid system 52 from environmental conditions, notably from moisture that could damage solenoid system 52 (particularly, the components within solenoid 54 that function to extend and retract solenoid pin 56). Solenoid system 52 functions to hold trigger latch 22 in the latched position adjacent and/or in contact with valve housing 24, which in turn holds trigger 18 in the open trigger position (and valve 34 in the open valve position) to allow fluid to flow through fluid channel 17. When instructed, solenoid system 52 can disengage/retract to no longer hold trigger latch 22 in the latched position, therefore allowing trigger latch 22 to become unlatched. When trigger latch 22 is unlatched, it no longer holds trigger 18 in the open trigger position and trigger 18 is allowed to rotate into the closed trigger position (and valve 34 moves into the closed valve position) to prevent fluid from flowing through fluid channel 17. Solenoid system 52 can includes one or multiple seals (e.g., bellows seal 62 and/or solenoid seal 64) that fluidically seal solenoid 54 to prevent environmental conditions, such as liquid and/or contaminants, from infiltrating solenoid 54 and damaging the internal components of solenoid 54. The sealing of solenoid 54 increases the lifespan of fluid dispenser system 10.

Solenoid system 52 includes solenoid 54, which can include an electrical coil or other components that, when electric current runs through the coil, retracts solenoid pin 56. Solenoid 54 can have any size, shape, and configuration that is able to retract solenoid pin 56. Solenoid 54 can be fluidically sealed so as to prevent fluid from seeping into solenoid 54 and damaging the internal components of solenoid 54. Additionally or alternatively, solenoid 54 can be sealed within housings 24 and/or 30 by solenoid seal 64, which can seal a gap between a cavity within which solenoid 54 is located and a void within which solenoid pin 56 is located, therefore sealing solenoid 54 within housings 24 and/or 30. Solenoid 54 can have a cover (shown in FIGS. 2A-2F) to contain the internal components of solenoid 54 that function to retract solenoid pin 56, and the cover can be constructed from a variety of materials, including plastic, metal, a composite, or another material. Solenoid 54 can include a battery that provide electric current to the internal components, or solenoid 54 can be connected to an external power source, such as a battery within meter 14 or a power source external to fluid dispenser system 10.

Solenoid pin 56 is connected to and extends outward from solenoid 54. Solenoid pin 56 can have any size, shape, and configuration to be able to be extended and retracted by solenoid 54 to hold trigger latch 22 in the latched position and allow trigger latch 22 to unlatch, respectfully. As shown in FIGS. 2A-2F, solenoid pin 56 is an elongated member having a cylindrical shape with one end that interacts with and is pulled by solenoid 54 and pin tip 58 that extends out an orifice in valve housing 24 to interact with trigger latch 22. Solenoid pin 56 can have any cross-sectional shape, including a square, rectangular, triangular, oval, or another shape suitable for holding trigger latch 22 in the latched position. Solenoid pin 56 should be constructed from a material that is able to withstand the bending forces imparted by trigger latch 22 at pin tip 58 and the forces imparted by solenoid 54 in retracting and extending solenoid pin 56. Solenoid pin 56 should have a length that is sufficient to, when extended, provide a surface at pin tip 58 upon which trigger latch 22 can sit to hold trigger latch 22 in the latched position. However, the length of solenoid pin 56 should not be too long so as to interfere with trigger 18 and trigger latch 22 when those two components are rotating into the open trigger position and latched position (i.e., the portion of pin tip 58 that extends outward through valve housing 24 should have a length that is able to hold trigger latch 22 in the latched position but not interfere in the movement of trigger latch 22 into the latched position). Solenoid pin 56 can include additional components on the end that interacts with solenoid body 56 to effectuate the retraction and extension of solenoid pin 56 by solenoid 54, such as magnetic material that interacts with an electric coil in solenoid 54 to retract solenoid pin 56.

Solenoid pin 56 can include a number of components, such as pin guide 60 that extends along solenoid pin 56 and supports solenoid pin 56 against bending and/or other deflection. Pin guide 60 can have any size, shape, and configuration to support solenoid pin 56 and can contain one or multiple bearings and/or seals between solenoid pin 56 and the void within which solenoid pin 56 is located. Pin guide 60 can move (extend and retract) along with solenoid pin 56 or can be stationary relative to solenoid pin 56 with solenoid pin 56 sliding through pin guide 60. Additionally, solenoid pin 56 and pin guide 60 can be one continuous and monolithic component or two or multiple components adjacent or fastened to one another. Bellows seal 62 can also be situated along solenoid pin 56 near a location where solenoid pin 56 extends into and interacts with solenoid 54. Bellows seal 62 fluidically seals the intersection between solenoid pin 56 and solenoid 54 to prevent fluid and/or other contaminants from entering the inside of solenoid 54, which could cause damage to the internal components of solenoid 54. Bellows seal 62 is configured to allow movement of solenoid pin 56 relative to solenoid 54 whilst also sealing the interface between the two. While bellows seal 62 is shown in FIGS. 2A-2F as an accordion-style bellows seal, bellows seal 62 can be any material and any type of seal that prevents fluid and/or contaminants from entering solenoid body 62. In the present embodiment, bellows seal 62 an annular shape constructed from a rubber material that is press fit to solenoid pin 56 and solenoid 54.

Solenoid system 52 can be configured to have solenoid pin 56 in the extended position when solenoid system 52 is at rest (i.e., no electric current is flowing through solenoid system 52) such that solenoid pin 56 is extended except when in the retracted position to unlatch trigger latch 22. In this configuration, to retract solenoid pin 56, solenoid system 52 is energized, which causes solenoid pin 56 to retract for sufficient time to allow trigger latch 22 to rotate out of the latched position. Solenoid system 52 requiring electricity only for a small amount of time to retract solenoid pin 56 improves the battery life and lifespan of fluid dispenser system 10 by limiting the amount of energy needed from the power source, which may be a battery contained within fluid dispenser system 10.

Pin tip 58 of solenoid pin 56 is extendable through valve housing 24 to contact and hold trigger latch 22 in the latched position adjacent ramp 46 of valve housing 24. Trigger latch 22 is adjacent trigger 18 and pivots between a latched position in which trigger latch 22 is adjacent ramp 46 and in contact with solenoid pin 56 and an unlatched position in which trigger latch 22 is free to pivot and does not hold trigger 18 in the open trigger position.

As shown most clearly in FIG. 3, which is a perspective view of trigger latch 22, trigger latch 22 has a pivot point at one end that extends through two arms 49 about which trigger latch 22 rotates and roller 48 at another end distant from the pivot point. In the present embodiment, the pivot point of trigger latch 22 is located on trigger 18 such that trigger latch 22 moves when trigger 18 rotates into the open trigger position and into the closed trigger position. However, trigger latch 22 rotates independent from trigger 18 such that trigger 18 can be in the open trigger position without trigger latch 22 being in the latched position. Trigger latch 22 can have any shape suitable for pivoting about a point on trigger 18 while also having roller 48 that interacts with solenoid pin 56. In the present embodiment as shown in FIG. 3, trigger latch 22 has a substantially U shape with arms 49 extending to attach to trigger 18 at the pivot point and curving inward to form a support structure to which roller 48 attaches. Trigger latch 22 can also include a body portion for accommodating latch spring 50, which can be located between the pivot point and roller 48. Trigger latch 22 can be constructed from any material suitable for handling the forces imparted by the operator, trigger 18, and/or solenoid pin 56.

Roller 48 is at the end of trigger latch 22 opposite the pivot point. Roller 48 is configured to rotate/roll about an axis parallel to the pivot point about which trigger latch 22 rotates. Roller 48 provides a surface for contact with solenoid pin 56 when in the latched position as well as a surface for contact with ramp 46 on valve housing 24. Due to roller 48 being configured to rotate/roll, roller 48 can rotate during the retraction of solenoid pin 56 (caused by the movement of solenoid pin 56, which in turn rotates roller 48) to reduce the amount of force needed to be imparted by solenoid system 52 on solenoid pin 56 to retract solenoid pin 56 (as compared to if roller 48 did not rotate and solenoid pin 56 would have to slide along a stationary roller to retract). Additionally, the rotation of roller 48 aids in roller 48 (and thus trigger latch 22) moving/rolling along ramp 46 (downward in FIGS. 2E and 2F) without causing excessive friction, which could result in damage to roller 48 and/or ramp 46. Ramp 46, which is located on the outer side of valve housing 24 and can be configured to contact roller 48 when trigger latch 22 is in the latched position, can be angled with respect to solenoid pin 56 (as shown in FIG. 2F) to reduce the amount of contact force between ramp 46 and roller 48. In one embodiment, ramp 46 is angled between seventy and ninety degrees as measured from solenoid pin 56 when in the latched position. The reduction of contact force increases the durability and lifespan of ramp 46, roller 48, solenoid pin 56, and trigger latch 22. Additionally, the angle of ramp 46 reduces the force on roller 48 and solenoid pin 56, which is advantageous because minimizing the force on solenoid pin 56 in turn reduces the side loading on solenoid pin 56 and ultimately the force required by solenoid 54 to retract solenoid pin 56. Thus, the reduction in force needed to retract solenoid pin 56 as caused by the angle of ramp 46 minimizes the battery power required for each retraction of solenoid pin 56 and increases overall battery life.

Roller 48 can have a variety of configurations and can be made from any material suitable for withstanding the forces needed to hold trigger latch 22 in the latched position. For example, roller 48 can be a cylinder with a constant or varying diameter along the axis of rotation. In another example, roller 48 can be one or multiple spheres. In the embodiment shown in FIG. 3, roller 48 includes three rollers: first roller 48A, second roller 48B, and third roller 48C which can be connected to one another so as to rotate in unison or can be three separate rollers that are capable of rotating independently. Second roller 48B is between first roller 48A and third roller 48C and has a smaller diameter than first roller 48A and third roller 48C. The width of solenoid pin 56 is similar to the length of second roller 48B such that solenoid pin 56 does not contact or only superficially contacts first roller 48A and third roller 48C. Thus, when solenoid pin 56 is retracting, only second pin 48B may rotate. With first roller 48A and third roller 48C having a greater diameter than second roller 48B, first roller 48A and third roller 48C can contact and roll along ramp 46 without second roller 48B contacting ramp 46. Thus, first roller 48A and third roller 48C can rotate as caused by ramp 46 while second roller 48B can rotate independently from the other rollers as caused by solenoid pin 56.

Trigger latch 22 can also include latch spring 50, which pivots with trigger latch 22. Latch spring 50 is a resilient member that biases trigger latch 22 away from valve housing 24 to rotate trigger latch 22 away from valve housing 24 when trigger latch 22 is not held in the latched position by solenoid pin 56. Latch spring 50 can be fastened to trigger latch 22 or can sit within a hole or groove in trigger latch 22 as shown in FIGS. 2A-2F. Latch spring 50 ensures that trigger latch 22 rotates out of the latched position when solenoid pin 56 is not extended, which in turn allows trigger 18 to rotate into the closed trigger position. Latch spring 50 can be a spring or another resilient member, such as a component constructed from a rubber material. Additionally, latch spring 50 can be surrounded by a protective cover to ensure that latch spring 50 does not become damaged due to environmental conditions.

Meter 14 is connected to and/or contained within meter housing 30 through which fluid channel 17 extends. Meter 14 can have input and display capabilities as described with regards to FIG. 1. The operator of fluid dispenser system 10 can input into meter 14 the amount of fluid he/she desires to have fluid dispenser system 10 dispense, and meter 14 can instruct solenoid system 52 to retract solenoid pin 56 to unlatch trigger latch 22 to allow trigger 18 to rotate into the closed trigger position and valve 34 to move into the closed valve position to stop fluid from flowing through fluid channel 17. Meter 14 can be of any desired configuration for controlling operation of solenoid system 52 and can include control circuitry and memory. Meter 14 can be configured to store executable code, implement functionality, and/or process instructions. Meter 14 can be configured to perform any of the functions discussed herein. Meter 14 can be of any suitable configuration for controlling operation of solenoid system 52 and/or receiving information from fluid measurement device 66 and/or other data collection devices, as well as gathering data, processing data, etc. Meter 14 can include hardware, firmware, and/or stored software. Meter 14 can be of any type suitable for operating in accordance with the techniques described herein. While meter 14 is illustrated as a single unit, it is understood that meter 14 can be entirely or partially mounted on one or more boards. In some examples, meter 14 can be implemented as a plurality of discrete circuitry subassemblies.

While omitted for clarity and ease of illustration, meter 14 can include one or more processors 68 and computer-readable memory. Examples of the one or more processors 68 can include any one or more of a microprocessor, a digital signal processor (DSP), an application specific integrated circuit (ASIC), a field-programmable gate array (FPGA), or other equivalent discrete or integrated logic circuitry.

Computer-readable memory can be configured to store information during operation. The computer-readable memory can be described, in some examples, as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). Computer-readable memory of meter 14 can include volatile and non-volatile memories. Examples of volatile memories can include random access memories (RAM), dynamic random access memories (DRAM), static random access memories (SRAM), and other forms of volatile memories. Examples of non-volatile memories can include magnetic hard discs, optical discs, flash memories, or forms of electrically programmable memories (EPROM) or electrically erasable and programmable (EEPROM) memories. In some examples, the memory is used to store program instructions for execution by the control circuitry. The memory, in one example, is used by software or applications running on the meter 14 to temporarily store information during program execution.

Meter 14 can provide instruction to solenoid system 52 via communication line 70, which can be any wired or wireless connection that conveys instructions and/or electric current between meter 14 and solenoid system 52. The instruction can be in the form of executable code that, when executed, causes solenoid system 52 to retract solenoid pin 56, or electric current provided to solenoid system 52 that flows through solenoid system 52 that results in the retraction of solenoid pin 56. Communication line 70 can extend only through meter housing 30 or through a portion of both of valve housing 24 and meter housing 30. Additionally, if communication line 70 is wireless, meter 14 can include wireless capabilities and can provide instruction and/or electric current to solenoid system 52 via RFID or another wireless technology. Meter 14 can include other components and functions not explicitly disclosed herein.

Fluid dispenser system 10 also include fluid measurement device 66, which measures the amount (e.g., volume or weight) of fluid flowing through fluid channel 17 and can transmit that measurement to meter 14. Also, fluid measurement device can be configured to transmit an indication when a preset amount of fluid has flowed through fluid channel 17. Fluid measurement device 66 can collect other information, such as the temperature and density of the fluid. Fluid measurement device 66 can be located within meter housing 30 or at another location along fluid channel 17 within fluid dispenser system 10. Fluid measurement device 66 can transmit information to meter 14 via wired or wireless communication, and can include other components such as a communication line. While discussed herein as only one measurement device, fluid measurement device 66 can include multiple measurement devices located anywhere on/within fluid dispenser system 10.

The following process as shown in FIGS. 2A-2F provides for fluid dispenser system 10 to dispense a specific, preset amount of fluid without the need for the operator to manually control the closing of valve 34 via the release of trigger 18. Before pulling trigger 18 to allow fluid to flow through fluid channel 17, the operator can enter a preset amount of fluid into meter 14 the operator desires for fluid dispenser system 10 to dispense. Alternatively, the preset amount can be a default amount selected by fluid dispenser system 10 or an amount that was previously selected/used.

Once the preset amount of fluid to be dispensed is set in meter 14, the operator can pull trigger 18 to rotate trigger 18 from the closed trigger position, shown in FIG. 1A with trigger 18 distant from valve housing 24, to the open trigger position, shown in FIG. 2B with trigger 18 rotated so as to be adjacent valve housing 24. When trigger 18 is in the closed trigger position as shown in FIG. 2A and in the open trigger position as shown in FIG. 2B, solenoid pin 56 can be in an extended, rested state. Solenoid pin 56 being extended when in the rested state does not require solenoid system 52 to be powered nearly all the time and instead only requires solenoid system 52 to be powered for a small amount of time when solenoid pin 56 is in a retracted state/position. Trigger 18 in the open trigger position in turn pushes valve 34 (valve head 35) into the open valve position to allow fluid to flow through fluid channel 17. The rotation of trigger 18 into the open trigger position as shown in FIG. 2B does not rotate trigger latch 22 into the latched position. Thus, if the operator were to release trigger 18 when in this position, trigger 18 would rotate into the closed trigger position. Meter 14 (and/or fluid measurement device 66) begins measuring/recording the fluid flowing through fluid channel 17 when valve 34 begins allowing fluid to flow through fluid channel 17, not when trigger latch 22 is in the latched position. Therefore, the total amount of fluid dispensed will be equal to the preset amount of fluid, since the measurement of fluid is recorded from when fluid begins to flow through fluid channel 17, not from when trigger latch 22 is latched. For the operator to override the preset amount, he/she just needs to release trigger 18 before moving trigger latch 22 into the latched position.

The next step is for the operator to rotate trigger latch 22 into the latched position, shown in FIGS. 2C and 2D, in which roller 48 is held by solenoid pin 56 (which is in the extended position). The operator can manual rotate trigger latch 22, or fluid dispenser system 10 can have automatic trigger latch 22 latching capabilities. Trigger latch 22 holds trigger 18 in the open trigger position (and valve 34 in the open valve position) through contact with trigger 18, which in turn prevents trigger 18 from rotating into the closed trigger position. Once trigger latch 22 is in the latched position, the operator does not need to pull/hold trigger 18 in the open trigger position and can let go entirely from fluid dispenser system 10. When in the position shown in FIGS. 2C and 2D, meter 14 and/or fluid measurement device 66 is recording the amount of fluid flowing through fluid channel 17 and waiting until the measured amount is equal to the preset amount.

Once the amount of fluid that has flowed through fluid channel 17 is equal to the preset amount (as measured by fluid measurement device 66 and communicated to meter 14), meter 14 instructed solenoid system 52 to retract solenoid pin 56. As discussed above, the instruction can be executable code that, when executed by solenoid system 52, results in solenoid pin 56 retracting, or the instruction can be electric current that creates a magnetic field that retracts solenoid pin 56. FIGS. 2E and 2F show solenoid pin 56 in a retracted position and trigger latch 22 unlatched but before trigger latch 22 has rotated completely into the unlatched position to allow trigger 18 to freely rotate into the closed trigger position. The position shown in FIGS. 2E and 2F is momentary because, when solenoid pin 56 is not holding trigger latch 22 in the latched position, latch spring 50 biases trigger latch 22 away from valve housing 24 and into the unlatched position (i.e., the location of trigger latch 22 in FIG. 2B). Once trigger latch 22 has rotated into the unlatched position, trigger 18 is free to rotate into the closed trigger position. When the operator and/or trigger latch 22 are not holding trigger 18 in the open trigger position, main spring 38 pushes on valve head 35, causing valve head 35 and primary plunger 36 to move to the left, which in turn causes cam 44 to rotate in the counterclockwise direction in FIGS. 2A-2F. The rotation of cam 44 in the counterclockwise direction in turn causes trigger 18 to rotate into the closed trigger position. If the operator desires to dispense more than the preset amount of fluid entered into meter 14, the operator can keep trigger 18 in the open trigger position by pulling trigger 18 even if trigger latch 22 is not in the latched position. Meter 14 can continue to display the measurement of fluid flowing through fluid channel 17 so the operator knows how much total fluid has been dispensed.

Fluid dispenser system 10 automatically stops dispensing fluid out of fluid channel 17 at a specific, preset amount such that fluid dispenser system 10 dispenses a particular amount of fluid as set by the operator via meter 14. Fluid dispenser system 10 accomplishes this by controlling the extension/retraction of solenoid pin 56. When in the extended position, solenoid pin 56 is configured to hold trigger latch 22 in the latched position adjacent valve housing 24, which in turn holds trigger 18 in the open trigger position and allows fluid to flow through fluid channel 17. When solenoid pin 56 is retracted, solenoid pin 56 no longer holds trigger latch 22 in the latched position. Trigger latch 22 rotates into the unlatched position, which in turn allows trigger 18 to rotate into the closed trigger position. When trigger 18 is in the closed trigger position, no fluid can flow through fluid channel 17 (because valve is in the closed valve position). Thus, the control of solenoid system 52 and solenoid pin 56 in turn controls the amount of fluid dispensed. Meter 14 can control solenoid system 52 by instructing solenoid pin 56 to retract or extend, and meter 14 can receive information from fluid measurement device 66 regarding the amount of fluid that has flowed through fluid channel 17 so that meter 14 knows when to instruct solenoid system 52 to retract solenoid pin 56. The automatic closing of valve 34 by trigger 18, trigger latch 22, and solenoid system 52 allows for more accurate dispensing of fluid without the need for the operator to manually move (or release) trigger 18.

As detailed above, trigger latch 22 with roller 48 or multiple rollers 48A-48C interacts with solenoid pin 56 to be held in the latched position by solenoid pin 56. Roller 48 can be held adjacent ramp 46, which can be angled to reduce the force on roller 48 and solenoid pin 56. The configuration of roller 48 (i.e., the ability for roller 48 to rotate when solenoid pin 56 is retracted) and the angle of ramp 46 reduce the force on solenoid pin 56, which in turn reduces the amount of force required by solenoid 54 to retract solenoid pin 56. This reduction in force needed by solenoid 54 to retract solenoid pin 56 decreases the battery power required for each retraction of solenoid pin 56 and increases the lifespan of solenoid 54 and solenoid pin 56. Additionally, the decreased forces on solenoid 54 and solenoid pin 56 reduces the likelihood that solenoid pin 56 will bend and/or break. Further, solenoid 54 being fluidically/environmentally sealed within valve housing 24 and/or meter housing 30 by bellows seal 62 and solenoid seal 64 prevents fluid and other contaminants from infiltrating solenoid 54 and damaging the internal components of solenoid 54, thus increasing the lifespan of solenoid 54 and of fluid dispenser system 10.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A fluid dispenser system configured to switch between an open valve position in which fluid flows through a fluid channel and a closed valve position in which fluid is prevented from flowing through the fluid channel, the system comprising:

a valve disposed along the fluid channel and configured to move between the open valve position and the closed valve position;

a trigger actuatable between an open trigger position and a closed trigger position which move the valve between the open valve position and the closed valve position, respectively;

a trigger latch configured to move between a latched position in which the trigger latch fixes the trigger in the open trigger position and an unlatched position in which the trigger latch does not constrain movement of the trigger; and a solenoid with a solenoid pin, the solenoid configured to translate the solenoid pin between an extended position that extends the solenoid pin towards the trigger to abut the trigger latch to retain the trigger latch in the latched position and a retracted position that allows the trigger latch to move into the unlatched position.

2. The fluid dispenser system of claim 1, further comprising:

a cam connected to the trigger and configured to rotate in unison with the trigger, wherein the valve comprises a primary plunger located in the fluid channel and in contact with the cam, and wherein the cam pushes the plunger into the open valve position when the cam is rotated by the trigger.

3. The fluid dispenser system of claim 2, wherein the valve further includes a main spring in contact with the primary plunger, the main spring configured to bias the primary plunger into the closed valve position when the cam is not pushing the plunger into the open valve position.

4. The fluid dispenser system of claim 1, wherein the solenoid includes at least one seal to fluidically seal the solenoid from environmental conditions.

5. The fluid dispenser system of claim 1, wherein the trigger latch includes at least one roller that extends substantially perpendicular to the solenoid pin, the solenoid pin being in contact with the at least one roller to hold the trigger latch in the latched position and not in contact when in the unlatched position.

6. The fluid dispenser system of claim 1, wherein the trigger latch includes a latch spring to bias the trigger latch to move away from the trigger and the solenoid pin when the solenoid pin is retracted.

7. The fluid dispenser system of claim 1, further comprising:

a valve housing that contains the valve, the solenoid, and at least a portion of the fluid channel.

8. The fluid dispenser system of claim 1, wherein the solenoid includes a solenoid seal between the solenoid and the valve housing.

9. The fluid dispenser system of claim 8, wherein the solenoid includes a pin guide on the solenoid pin to provide structural support to the solenoid pin.

10. The fluid dispenser system of claim 1, further comprising:

a meter including at least one computer processor, the meter configured to instruct the solenoid to retract the solenoid pin to allow the trigger latch to move into the unlatched position and allow the trigger to move into the closed trigger position.

11. A fluid dispenser system configured to switch between an open valve position in which fluid flows through a fluid channel and a closed valve position in which fluid is prevented from flowing through the fluid channel, the system comprising:

a valve disposed along the fluid channel and configured to move between the open valve position and the closed valve position;

a trigger actuatable between an open trigger position and a closed trigger position which move the valve between the open valve position and the closed valve position, respectively;

a trigger latch configured to move between a latched position in which the trigger latch fixes the trigger in the open trigger position and an unlatched position in which the trigger latch does not constrain movement of the trigger; and a solenoid with a solenoid pin, the solenoid configured to translate the solenoid pin between an extended position capable of retaining the trigger latch in the latched position and a retracted position that allows the trigger latch to move into the unlatched position, wherein the trigger latch includes at least one roller that extends substantially perpendicular to the solenoid pin, the solenoid pin being in contact with the at least one roller to hold the trigger latch in the latched position and not in contact when in the unlatched position.

12. The fluid dispenser system of claim 11, wherein the at least one roller is configured to rotate as caused by the retraction of the solenoid pin.

13. The fluid dispenser system of claim 11, wherein the at least one roller includes a first roller, a second roller, and a third roller, the first and third rollers having a greater diameter than the second roller.

14. The fluid dispenser system of claim 13, wherein the second roller is between the first and third rollers and is in contact with the solenoid pin when in the latched position.

15. The fluid dispenser system of claim 13, wherein the first and third rollers are in contact with a valve housing when in the latched position.

16. The fluid dispenser system of claim 11, wherein the at least one roller is in contact with the solenoid pin and a ramp on a valve housing when in the latched position.

17. The fluid dispenser system of claim 16, wherein the ramp has at least one portion that is angled with respect to the solenoid pin with the angle being between seventy and ninety degrees as measured from the solenoid pin.

18. The fluid dispenser system of claim 17, further comprising:

a fluid measurement device along the fluid channel configured to measure the volume of fluid flowing through the fluid channel and communicate that volume to the meter.

19. The fluid dispenser system of claim 18, wherein the display of the meter visually shows a continuous measurement of the volume that has flowed through the fluid channel.

20. The fluid dispenser system of claim 16, wherein the meter includes a display and at least one key for setting a volume of fluid that the valve allows to flow through the fluid channel, the meter configured to instruct the solenoid to retract the solenoid pin when that volume has flowed through the fluid channel.

* * * * *